US011954167B1

(12) United States Patent
Hariramasamy et al.

(10) Patent No.: US 11,954,167 B1
(45) Date of Patent: Apr. 9, 2024

(54) TECHNIQUES FOR PRESENTING GRAPHICAL CONTENT IN A SEARCH RESULT

(71) Applicant: Google LLC, Mountain View, CA (US)

(72) Inventors: Senthil Kumar Hariramasamy, Los Altos, CA (US); Omar Frazer Restom, San Francisco, CA (US); Abhinav Gaiha, Mountain View, CA (US); Bhavika Goyal, San Francisco, CA (US); Rushil Grover, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/086,018

(22) Filed: Dec. 21, 2022

(51) Int. Cl.
G06F 17/00 (2019.01)
G06F 16/955 (2019.01)
G06V 10/776 (2022.01)

(52) U.S. Cl.
CPC ........ G06F 16/9558 (2019.01); G06V 10/776 (2022.01); *G06V 2201/09* (2022.01)

(58) Field of Classification Search
CPC .............. G06F 16/9558; G06V 10/776; G06V 2201/09
See application file for complete search history.

(56) References Cited

U.S. PATENT DOCUMENTS

| 7,574,659 B2 * | 8/2009 | Szabo | G06F 16/954 715/962 |
| 2013/0198158 A1 * | 8/2013 | Tijssen | G06F 16/9558 707/765 |
| 2015/0046278 A1 * | 2/2015 | Pei | G06Q 30/0269 705/26.3 |

(Continued)

FOREIGN PATENT DOCUMENTS

| CN | 104933172 A | * | 9/2015 |
| CN | 112651748 A | * | 4/2021 |

(Continued)

OTHER PUBLICATIONS

Edwards, "Search On 2022: Search and Explore Information in New Ways", Google Blog—The Keyword, Sep. 28, 2022, https://blog.google/products/search/search-on-2022-announcements/, retrieved on May 16, 2023, 8 pages.

(Continued)

*Primary Examiner* — Laurie A Ries
(74) *Attorney, Agent, or Firm* — Dority & Manning, P.A.

(57) ABSTRACT

Techniques for presenting a search result with an improved user interface. A computer system can receive, from a user device, a request for a content item. Additionally, the system can select, based on the request, a first content item from a plurality of content items. The first content item can be associated with an organization image and an organization name of an organization. Moreover, the system can process, using one or more machine-learned model, the organization image to determine whether the organization image is (Continued)

acceptable to be presented in the search result. Subsequently, the system can transmit, to the user device, the first content item and the organization image to be presented in the search result.

18 Claims, 6 Drawing Sheets

(56) References Cited

U.S. PATENT DOCUMENTS

| | | | |
|---|---|---|---|
| 2015/0199727 A1* | 7/2015 | Naveh | G06Q 50/01 |
| | | | 705/14.66 |
| 2017/0061014 A1 | 3/2017 | Heiler et al. | |
| 2017/0091270 A1* | 3/2017 | Guo | G06F 16/5854 |
| 2017/0193545 A1* | 7/2017 | Zhou | G06Q 30/0254 |
| 2017/0371880 A1* | 12/2017 | Chang | G06F 16/24578 |
| 2018/0060359 A1* | 3/2018 | Li | G06F 16/5866 |
| 2018/0165364 A1* | 6/2018 | Mehta | G06F 9/54 |
| 2019/0108557 A1* | 4/2019 | Jain | G06Q 30/0269 |
| 2019/0156374 A1* | 5/2019 | Athsani | G06Q 30/0273 |
| 2020/0104329 A1* | 4/2020 | Kundu | G06F 3/0484 |
| 2020/0334315 A1* | 10/2020 | Du | G06F 16/338 |
| 2021/0019567 A1* | 1/2021 | Gandhi | G06N 5/02 |
| 2021/0365968 A1* | 11/2021 | Narula | G06Q 30/0201 |
| 2022/0035884 A1* | 2/2022 | Kwatra | G06N 7/01 |
| 2022/0100767 A1* | 3/2022 | Ghoshal | G06F 40/237 |
| 2022/0222366 A1* | 7/2022 | Nagaraja | G06F 16/285 |
| 2022/0245651 A1 | 8/2022 | Lillard et al. | |
| 2022/0284065 A1* | 9/2022 | Gentilello | G06F 16/9566 |
| 2023/0031874 A1* | 2/2023 | Goldfield | G06Q 40/12 |
| 2023/0081266 A1* | 3/2023 | Crume | H04L 63/1416 |
| | | | 726/23 |
| 2023/0128790 A1* | 4/2023 | Mayne | H04L 9/3226 |
| | | | 713/172 |

FOREIGN PATENT DOCUMENTS

| | | | |
|---|---|---|---|
| CN | 115114114 A | * | 9/2022 |
| CN | 115222522 A | * | 10/2022 |
| WO | 2019/010182 | | 1/2019 |

OTHER PUBLICATIONS

Google, "Deliver More Helpful Search Ads by Adding Your Business Information", https://support.google.com/google-ads/answer/12834372?hl =en, Oct. 14, 2022, 3 pages.

Raghavan, "Search Outside the Box: How We're Making Search More Natural and Intuitive", Google Blog—The Keyword, Sep. 28, 2022, https://blog.google/products/search/new-search-technology/, retrieved on May 16, 2023, 4 pages.

Vajolahi et al., "Helping You Easily Identify Information Sources in Search", Google Blog—The Keyword, October 14, 2022, https://blog.google/products/search/identify-information-sources/, retrieved on May 16, 2023, 2 pages.

International Search Report and Written Opinion for PCT/US2023/024120, dated Sep. 7, 2023, 11 pages.

* cited by examiner

TECHNIQUES FOR PRESENTING GRAPHICAL CONTENT IN A SEARCH RESULT

FIELD

The present disclosure relates generally to the field of improving user experience with online content presented in response to a search query. More particularly, the present disclosure relates to using a content serving system to improve user interactions by presenting search results with verified images and names.

BACKGROUND

Businesses and other entities use the internet to increase awareness of their products and services. A content serving system can present search results in response to a search query. In some instances, the search query can be associated with a keyword. The order of search results returned by the content serving system is based, in part, on a ranking system. The search results can also be supplemented with sponsored content. For example, a business can place sponsored content on a web page that is not hosted by the business in order to reach a wider audience. When a user selects the sponsored content, the user can be redirected to a webpage about the products and services of the business. Bad actors may try to confuse a user by providing content that mimics known organizations in order to get a user to select their content.

SUMMARY

Aspects and advantages of embodiments of the present disclosure will be set forth in part in the following description, or can be learned from the description, or can be learned through practice of the embodiments.

One example aspect of the present disclosure is directed to a computer system for presenting a search result. The computer system can include one or more processors and one or more non-transitory computer-readable media. In some instances, the one or more non-transitory computer-readable media can collectively store one or more machine-learned models and instructions. The one or more machine-learned models can be configured to determine whether an image is acceptable to be presented in the search result. The instructions, when executed by the one or more processors, can cause the computing system to perform operations. The operations can include receiving, from a user device, a request for a content item. Additionally, the operations can include selecting, based on the request, a first content item from a plurality of content items. The first content item can be associated with an organization image of an organization. Moreover, the operations can include processing, using the one or more machine-learned model, the organization image to determine whether the organization image is acceptable to be presented in the search result. Furthermore, the operations can include transmitting, to the user device, the first content item and the organization image to be presented in the search result based on the determination that the organization image is acceptable.

In some instances, the operations can further include presenting, on a display of the user device, the first online content item with the organization image when the image is determined to be acceptable.

In some instances, the first content item can also be associated with an organization name of the organization. The operations can further include processing, using the one or more machine-learned model, the organization name to determine whether the organization is verified. Additionally, the operations can include transmitting, to the user device, the organization name to be presented in the search result based on the determination that the organization name is verified.

In some instances, the operations can further include presenting, on a display of the user device, the first online content item with the organization image when the organization image is determined to be acceptable, and the first online content item with the organization name when the organization name is determined to be verified.

In some instances, the first content item can include a link, and the organization image can be placed on the left side of the link. Additionally, the organization name can be placed above the link. Moreover, the link can be a Uniform Resource Locator of an address associated with a web page of the organization.

In some instances, the operations can further include presenting, on a display of the user device, the first online content item with the organization image when the organization image is determined to be acceptable. Additionally, the operations can further include presenting, on a display of the user device, the first online content item without the organization name when the organization name is determined to not be verified.

In some instances, the organization name is verified in real-time by querying a database of verified organizations. For example, the database of verified organizations can be a first-party database that is maintained by the computer system to improve the query time.

In some instances, the first content item can be a sponsored content item. The operations can further include obtaining payment information from the organization. Additionally, the operations can further include processing, using the one or more machine-learned model, the organization name with the payment information to determine whether the organization is verified.

In some instances, the operations can further include obtaining a search ranking score for the first content item. Additionally, the operations can include processing, using the one or more machine-learned model, the organization name with the search ranking score to determine whether the organization is verified.

In some instances, the operations can include accessing a list of verified organization names from a verified organization database. Additionally, the operations can include processing, using the one or more machine-learned model, the organization name with the list of verified organization names to determine whether the organization is verified.

In some instances, the operations can include extracting, in response to the request, the organization image from a webpage of the organization that is associated with the first content item. Additionally, the operations can include receiving from a device associated with the organization, a confirmation of the organization image. Moreover, the operations can include storing the organization image in an image database.

In some instances, the operations can further include extracting, in response to the request, the organization image from a webpage of the organization that is associated with the first content item. Additionally, the operations can include storing the organization image in an image database.

In some instances, the operations can further include receiving from a device associated with the organization, the organization image. Additionally, the operations can include storing the organization image in an image database.

In some instances, the operations can further include accessing, from an image database, a plurality of similar images based on the organization image. Additionally, the operations can include processing, using the one or more machine-learned model, the organization image with the plurality of similar images to determine whether the organization image is acceptable to be presented in the search result. Moreover, the determination that the organization image is acceptable can be performed offline by the one or more machine-learned model before receiving the request from the user device. Furthermore the images stored in the image database can be labeled as either acceptable or not acceptable. In some instances, the plurality of similar images being accessed from the image database are determined by the one or more machine-learned model.

In some instances, the operations can further include identifying a plurality of content items based on the request. Additionally, the operations can include selecting, based on a search ranking score, the first content item from the plurality of content items.

In some instances, the operations can further include presenting, on a display of the user device, the first online content item without the organization image when the image is determined not acceptable.

Another example aspect of the present disclosure is directed to a computer-implemented method to present a search result. The method can include receiving, from a user device, a request for a content item. Additionally, the method can include selecting, based on the request, a first content item from a plurality of content items. The first content item can be associated with an organization image of an organization. Moreover, the method can include processing, using one or more machine-learned models, the organization image to determine whether the organization image is acceptable to be presented in the search result. Subsequently, the method can include transmitting, to the user device, the first content item and the organization image to be presented in the search result based on the determination that the organization image is acceptable.

Another example aspect of the present disclosure is directed to one or more non-transitory computer-readable media that store instructions that, when executed by one or more processors, cause the one or more processors to perform operations. The operations can include receiving, from a user device, a request for a content item. Additionally, the operations can include selecting, based on the request, a first content item from a plurality of content items. The first content item can be associated with an organization image of an organization. Moreover, the operations can include processing, using the one or more machine-learned model, the organization image to determine whether the organization image is acceptable to be presented in the search result. Furthermore, the operations can include transmitting, to the user device, the first content item and the organization image to be presented in the search result based on the determination that the organization image is acceptable.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
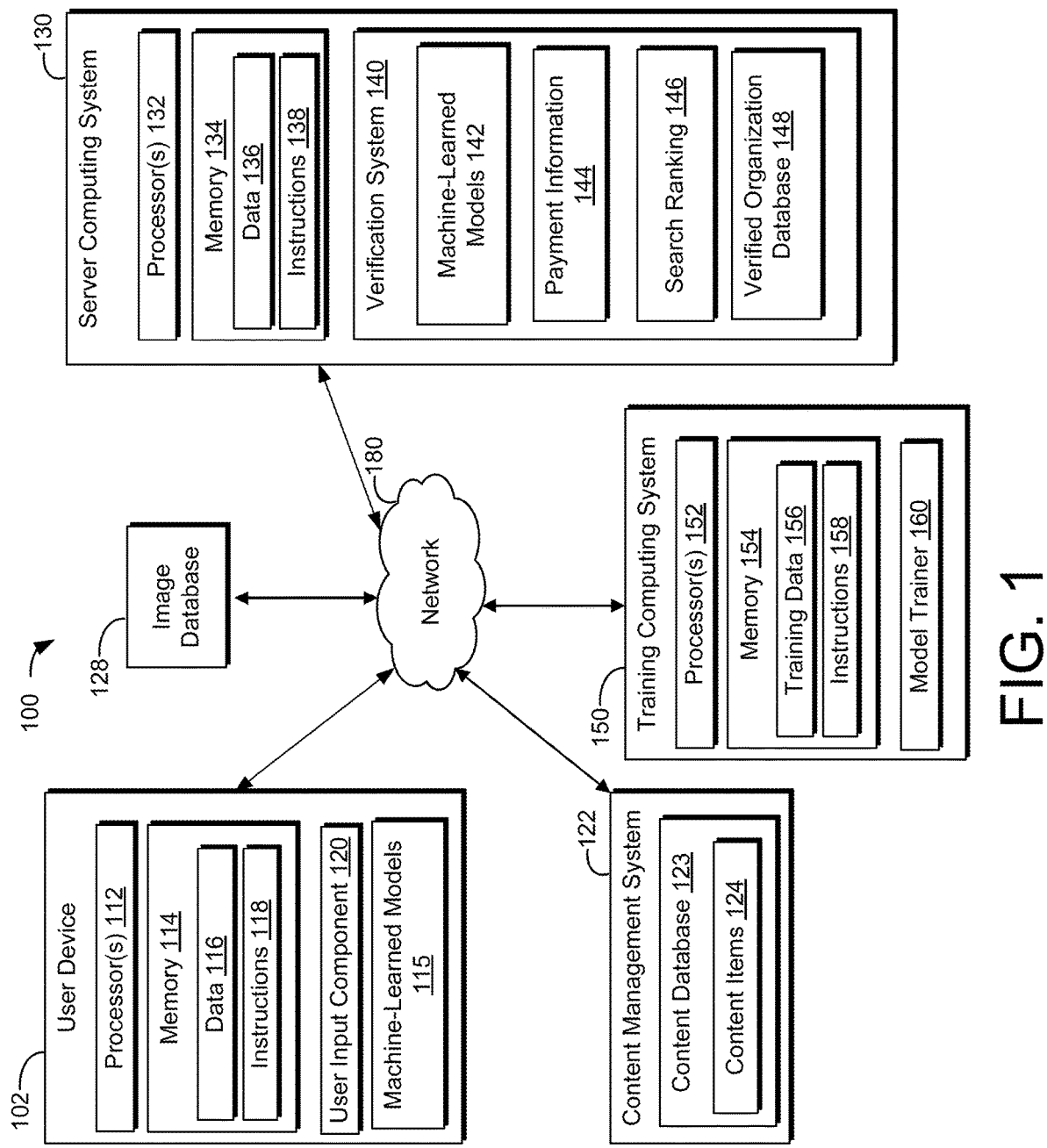
FIG. 1 depicts a block diagram of an example system according to some implementations of the present disclosure.

Reference numerals that are repeated across plural figures are intended to identify the same features in various implementations.

DETAILED DESCRIPTION

Generally, the present disclosure is directed to presenting content in a search result with an image and name associated with an organization that is both acceptable and verified. More specifically, the system can filter out organization images that are not acceptable and organization names that are not verified in order to improve a user's search experience.

Techniques described herein allows for an improved user experience by reducing the likelihood of confusion for a user when content is presented in a search result. By presenting acceptable images and verified organizations, the user can quickly determine additional information about an organization without having to go to the webpage (e.g., landing page) of the organization. Additionally, the system leverages machine-learned models to provide safeguards and quality assurances for the content presented in the search results. These improvements can have important applications, especially for search, because it reduces the likelihood of confusion and prevents inappropriate images and names from being presented.

Techniques described herein improve computer-related technologies by providing additional search information (e.g., organization image, organization name) that is both acceptable and verified in real-time. In order to provide the additional information in real-time, in response to a search query, the system is configured to perform some of the operations offline and some of the operations in real-time. For example, in some instances, the system can include an image database that has labeled image data. The labeled image data can include whether the image is acceptable or not acceptable. The determination of whether an image is acceptable is performed using machine-learned models. For example, some of the operations for determining whether the image is acceptable can be performed offline when the image is uploaded by the organization or when the image is obtained (e.g., crawled) from a webpage of the organization. Additionally, the verification of the organization and organization name can be performed in real-time by having a database of verified organizations. For example, the database of verified organizations can be a first-party database that is maintained and updated by the system (e.g., content serving system) in order to be able to quickly query the database for verification information.

In some instances, a verification system can be communicably and operatively coupled to a verified organization database and/or an image database. The verified organization database can be configured to store a variety of information relevant to the authenticity of an organization. The verification system can be configured to query, in real-time, the verified organization database for information and store information in the verified organization database. By having the verified organization database be part of the verification system, the system architecture allows for real-time database queries, which improves the user experience for search. For example, the verification system can store locally the list of verified organizations in order to reduce the query latency of retrieving the list of verified organizations. Similar to the verified organization database, by having some parts of the image database be part of the verification system, the system architecture allows for real-time database queries, which improves the user experience for search. For example, the verification system can store locally acceptable images that are associated with a verified organization in order to reduce the query latency of retrieving the acceptable images.

Techniques described herein provide novel ways to provide and verify an image of the organization and the name of the organization in the search results. For example, the verification process, which may be performed in real-time, prevents bad actors from showing a business logo of a trusted business. The verification process can reduce the likelihood of confusion by a user and prevent a user from clicking on a link of an imposter organization trying to mimic a trusted brand. The system can implement various safeguards techniques to ensure that users see more trustworthy logos and trustworthy business names. The real-time verification process enables a better user experience. For example, the system, which can be automated, can check whether the business name is present prominently in the landing page, and whether the business name and the URL have strong similarities. The system can ensure that a keyword having a random string does not produce search results having organizations with imposter images and/or organization names.

According to some embodiments, content that is associated with an organization can be presented, by a content serving system, to a user to include an image of the organization and/or a name of the organization. By including the image and/or the name of the organization, a user can easily and quickly obtain additional information about the organization without having to go to the organization's website. Additionally, the content serving system can include safeguards to prevent bad actors from presenting incorrect information (e.g., image, organization name). For example, an imposter organization may want to mimic a reputable organization by trying to spoof the system to present a misleading image and/or name.

In some instances, the content presented by the content serving system can be either sponsored content or organic content. Sponsored content can include content of an organization that may have paid a fee to appear in the search results for relevant search queries. Organic content can include unpaid content of an organization that appears in the search results for relevant search queries based on a ranking.

In the sponsored content scenario, the content serving system can serve sponsored content with visual information in response to a search query by a user. Sponsored content can be designed to inform and promote goods and services offered by content providers. For example, a user can request a search query, and the content serving system can present search results to the search query, where the search results can also include sponsored content with an image and name of an organization. The sponsored content can include an image of the organization, such as a business logo. Additionally, the sponsored content can include a name of the organization (e.g., business name). By including the image and name of the organization in the sponsored content, the user experience can be improved. From a user perspective, the image and name of the organization can indicate to a user the organization that is sponsoring the content. The visual information (e.g., image of the organization) in the sponsored content can assist a user in obtaining information quickly. For example, the user can quickly obtain the image and name of the organization without having to go to the website of the organization. In part, because visual information can be instantly recognized, especially for familiar or recognizable brands. Additionally, the business name can also make the URL in the sponsored content more readable.

In the organic content scenario, the content serving system can present content (e.g., in a search results) in response to a search query by a user. The order of search results returned can be based, in part, on a ranking system. In this scenario, the top ranked search results have a higher likelihood to be selected by the user. As a result, there may be an obligation from the content serving system to provide high quality search results and to provide a proper representation of the search query to the user.

In some instances, the system may only allow trusted content to have an accompanying image and business name. For example, sponsored content may have to be trusted and verified prior to being presented to a user. In some instances, organic content may not need to go through the verification process. Content can be trusted if the organization associated with the content has been verified using a verification process. In one example, the system can verify the organization by querying a third-party verification database. In this example, the verification process can be pre-computed prior to the determination of serving content to a user (e.g., as described in FIG. 4).

Additionally, the verification process can include eligibility criteria for a domain associated with the sponsored content. Eligibility can be applicable to sponsored content, and the verification process is performed for content (e.g., assets) that will be presented in as sponsored content. Search Ad. In some instances, content that will be presented as organic content do not need to have been verified.

In some instances, the content serving system can utilize payment information of an organization to verify the organization. For example, an organization may pay a fee for the sponsored content. The content serving system can verify the payment information used by the organization to determine whether the organization can be trusted. The sponsored content can include an image of the organization and/or a name of the organization if the content serving system determines that the organization is verified based on the payment information.

In some instances, the content serving system can determine whether the sponsored content would be included in a top number (e.g., top 10, 20, 50) contents of an organic search results based on an organic ranking system. For example, a user can request a keyword search, and the content serving system can determine that the sponsored content is ranked in the top 20 of the search results. Given that the sponsored content is ranked higher than a predetermined rank number (e.g., top 20), then the content serving system can include the sponsored content in the search results, and the sponsored content can include an image and/or business name associated with the organization.

According to some embodiments, the system can present an improved user interface for content (e.g., sponsored content, organic content) being presented in the search results. In some instances, the user interface can include a plurality of lines (e.g., two lines). For example, the first line can be an organization name, and the second line can be a URL associated with the organization. Additionally, the user interface can include an image associated with the organization. By having a plurality of lines, the user interface gives more prominence to both the business name and the image associated with the organization. The image can be a circular or a rectangular image of the organization (e.g., logo). The image can be a graphic mark, emblem, or symbol used to aid and promote public identification and recognition of the organization. The image can be an abstract or figurative design. Additionally, the image includes text of, or derived from, the name of the organization. Moreover, in some instances, the sponsored content can be labeled as 'promoted' or 'sponsored' content in the search results.

In some instances, the image in the presented content can be an icon (e.g., favicon). In some instances, the system can select one icon per site. The site can be defined by a hostname. For example, https://www.example.com/ and https://code.example.com/ are two different hostnames, and therefore can have two different icons. Additionally, when the content presented includes an image or business name, the system can crawl the home page and the icon file (e.g., stored in the HTML code) for verification purposes. Therefore, if the system does not have access to the icon file, then the content can be presented without an image or business name.

Additionally, the content serving system verifies that the image is an appropriate image. If the system deems that the image is inappropriate, then the image can be replaced with a default icon. In some instances, organizations (e.g., publishers) can also provide images directly to the content serving system. The content serving system can perform a verification process to ensure that the images received from the organization are appropriate.

Moreover, the content serving system can determine whether the image can be confused (e.g., misconstrued) with a known image of a known organization. In some instances, the content serving system can calculate a similarity score of an image with a specific keyword. Additionally, the content serving system can calculate a similarity score of a business name associated with the keyword. For example, when the keyword of search query is for a known airline company, and the similarity score of an image and/or business name (e.g., not from the known airline company) is higher than a predetermined threshold value, then the image and/or business name are not presented as part of the content in the search result. Machine-learned models can calculate the similarity scores based on the likelihood of confusion between the image of an organization and the known image of a known organization. By preventing similar images being presented, the content serving system can prevent bad actors from mimicking known brands in order to confuse consumers.

FIG. 1 depicts a block diagram of an example computing system 100 according to example embodiments of the present disclosure. The system 100 includes a user device 102, a server computing system 130, a content management system 122, image database 128, and a training computing device 150 that are communicatively coupled over a network 180.

The user device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user device 102 to perform operations.

The user device 102 can also include one or more user input components 120 that receives user input. For example, the user input component 120 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The user device 102 may be used by a user to perform various actions and/or access various types of content, some of which may be provided over a network 180. The user device 102 may be used to send data to the server computing system 130, or may be used to access web sites (e.g., using an internet browser), media files, and/or any other types of content. In some implementations, the user device 102 has enabled location services which can be tracked over network 180. Location services may use GPS or other technologies to determine a location of user device 102.

In some implementations, the user device 102 can store or include one or more models 115. For example, the models 115 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. In other examples, the models 115 can be specific image comparison models which are differentiable, and which have been parameterized to facilitate application of machine learning techniques. Example models 115 are discussed with reference to FIGS. 2-5.

In some implementations, the one or more models 115 can be received from the server computing system 130 over network 180, stored in the user computing device memory 114, and then used or otherwise implemented by the one or more processors 112. In some implementations, the user computing device 102 can implement multiple parallel instances of a single model 115.

More particularly, the models 115 can be trained using a training computing system 150 with a set of training data 156 to train the parameters of the model to optimize the model. The training computing system 150 may include image comparison data (e.g., data for comparing two similar images) to add efficiency and precision to the training module. Training data may also include the creation of low-resolution processed image data from high-resolution raw image data. Masks may also be used in training to provide a region of interest.

Additionally, or alternatively, one or more models 142 can be included in or otherwise stored and implemented by the server computing system 130 that communicates with the user computing device 102 according to a client-server relationship. For example, the models 142 can be implemented by the server computing system 130 as a portion of a web service. Thus, one or more models 115 can be stored and implemented at the user computing device 102 and/or one or more models 142 can be stored and implemented at the server computing system 130.

The content management system 122 may be configured to select content for display to users within resources (e.g., webpages, applications) and to provide content items to the user device 102 over the network 180 for display within the resources. The content from which the content management system 122 selects items may be provided by one or more content providers via the network 180. In some implementations, the content management system 122 may select content items from content providers to be displayed on the user device 102. In such implementations, the content management system 122 may determine content to be published in one or more content interfaces of resources (e.g., webpages, applications).

The server computing system 130 includes one or more processors 132 and a memory 134. The server computing system 130 can be the content serving system as described herein. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more models 142. For example, the models 142 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 142 are discussed with reference to FIGS. 2-5.

The user computing device 102 and/or the server computing system 130 can train the models 115 and/or 142 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store training data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 115 and/or 142 stored at the user computing device 102 and/or the server computing system 130 using various training or learning techniques, such as, for example, backwards propagation of errors. For example, a loss function can be back propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the image comparing models 115 and/or 142 based on a set of training data 156. The training data 156 can include, for example, a set of raw image data, a set of processed image data, and a set of masks to indicate the region of interest.

The model trainer 160 includes computer logic utilized to provide desired functionality. The model trainer 160 can be implemented in hardware, firmware, and/or software controlling a general-purpose processor. For example, in some implementations, the model trainer 160 includes program files stored on a storage device, loaded into a memory, and executed by one or more processors. In other implementations, the model trainer 160 includes one or more sets of computer-executable instructions that are stored in a tangible computer-readable storage medium such as RAM hard disk or optical or magnetic media.

In some implementations, the server computing system 130 can store or otherwise include a verification system 140. For example, the verification system 140 can determine whether an organization image is acceptable and determine whether an organization name is verified. The verification system can include one or more machine-learned models 142, payment information 144 of organizations, search ranking 146 information of organizations, and a verified organization database 148 of verified organizations. For example, the verified organization database 148 can include a list of organizations that the system 130 has previously determined to be verified. The payment information 144 data may be payment data from an organization that pays a fee for having sponsored content displayed in a search result. The search ranking 146 can be ranking of a content in an organic search result. It should be understood that various implementations may include more, fewer, or different systems than illustrated in FIG. 1, and all such modifications are contemplated within the scope of the present disclosure.

In some implementations, an image database 128 may include data collected by the server computing system 130 by crawling web pages for image data. Additionally, the image database 128 can include image data that has been uploaded by users (e.g., organizations). The data may be content input and response for a particular image at one or more points in time.

The server computing system 130 can train the models 142 via interaction with the training computing system 150 that is communicatively coupled over the network 180.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The verification system 140 may be used by content management system 122 to determine whether an organization image is acceptable and whether an organization name is verified. In various implementations, the verification system 140 and the content management system 122 in FIG. 1 can be implemented as separate systems or integrated within a single system (e.g., the content management system 122 can be configured to incorporate some or all the functions/capabilities of the verification system 140). The verification system 140 may be configured to communicate over network 180 via a variety of architectures (e.g., client/server, peer-to-peer).

The verification system 140 can be communicably and operatively coupled to the verified organization database 148 which may be configured to store a variety of information relevant to the authenticity of an organization. Additionally, information received from user device 102, content management system 122 and image database 128, can be stored in the verified organization database 148. The verification system 140 can be configured to query, in real-time, the verified organization database 148 for information and store information in the verified organization database 148. By having the verified organization database 148 be part of the verification system 140, the system architecture allows for real-time database queries, which improves the user experience for search. For example, the verification system 140 can store locally the list of verified organizations in order to reduce the query latency of retrieving the list of verified organizations.

In some implementations, the verification system 140 can be communicably and operatively coupled to the image database 128 which may be configured to store a plurality of images that have been crawled from webpages or uploaded to the server computing system 130 by a user. Additionally, information received from user device 102, content management system 122 and verified organization database 148, can be stored in the image database 128. The verification system 140 can be configured to query the image database 128 for information and store information in the image database 128. Similar to the verified organization database 148, by having some parts of the image database 128 be part of the verification system 140, the system architecture allows for real-time database queries, which improves the user experience for search. For example, the verification system 140 can store locally acceptable images that are associated with a verified organization in order to reduce the query latency of retrieving the acceptable images.

In various implementations, the databases 128, 148 includes various transitory and/or non-transitory storage mediums. The storage mediums may include but are not limited to magnetic storage, optical storage, flash storage, RAM, etc. The databases 128, 148 and/or the verification system 140 can use various APIs to perform database functions, such as managing data stored in the databases 128, 148. The APIs can be but are not limited to SQL, NoSQL, NewSQL, ODBC, JDBC.

The verification system 140 can be configured to communicate with any device or system shown in computing system 100 via network 180. The verification system 140 can be configured to receive information from the network 180. The information may include browsing histories, cookie logs, television content data, and/or online content activity data. The verification system 140 can be configured to receive and/or collect the interactions that the user device 102 has on the network 180. The verification system 140 can be configured to receive and/or collect the interactions that the content management system 122 has on the network 180.

Example Graphical User Interface

Figure 2:
FIG. 2 depicts an example graphical user interface presented by a content serving system according to some implementations of the present disclosure.

FIG. 2 illustrates an example of a user interface 200 for the presentation of sponsored content. The user interface 200 may be, for example, a hypertext markup language (HTML) page presented to a user in a web browser executing on a user device or presented in a custom application executing on the user device. An example user device is an electronic device that is under control of a user and that is capable of requesting and receiving resources over the network.

The user interface 200 includes a search entry area 202. In the search entry area 202 is a query input field 204. The query input field 204 allows a user of the user device to provide a query, in this example "best road trips from Seattle" that is transmitted to a search engine. The query may be sent to the search engine using the Hyper-Text Transport Protocol (HTTP).

The user interface 200 also includes a search button 206. Clicking on the search button 206 can cause the user interface 200 to transmit the contents of the query input field 204 to the search engine.

Beneath the search entry area 202 is a first sponsored content area 208. In the sponsored content area 208 is sponsored content that is relevant to the query in the query input field 204. In this example, the first sponsored content area 208 includes sponsored content. The sponsored content may include a link 210 (e.g., URL) that causes the user interface 200 to visit a web page identified by the content provider. The sponsored content may also include an image 212 of the organization and a name 214 of the organization.

In some implementations, the e-mail address may be pre-populated with the user's email address, for example, if the user has registered and logged into the services associated with the user interface 200.

In some implementations, the content provider may pay a fee to the content management system in response to the user interacting with the sponsored content, for example selecting the link 210.

In some implementations, the user interface can include a plurality of sponsored content areas, such as the first sponsored content area 208 and the second sponsored content area 216. Beneath the sponsored content areas 208, 216 can be the search results area 218. The search results area 218 includes a list of resources (e.g., web pages, images, videos, or other content) that the search engine identifies as responsive to the query.

Example Methods

Figure 3:
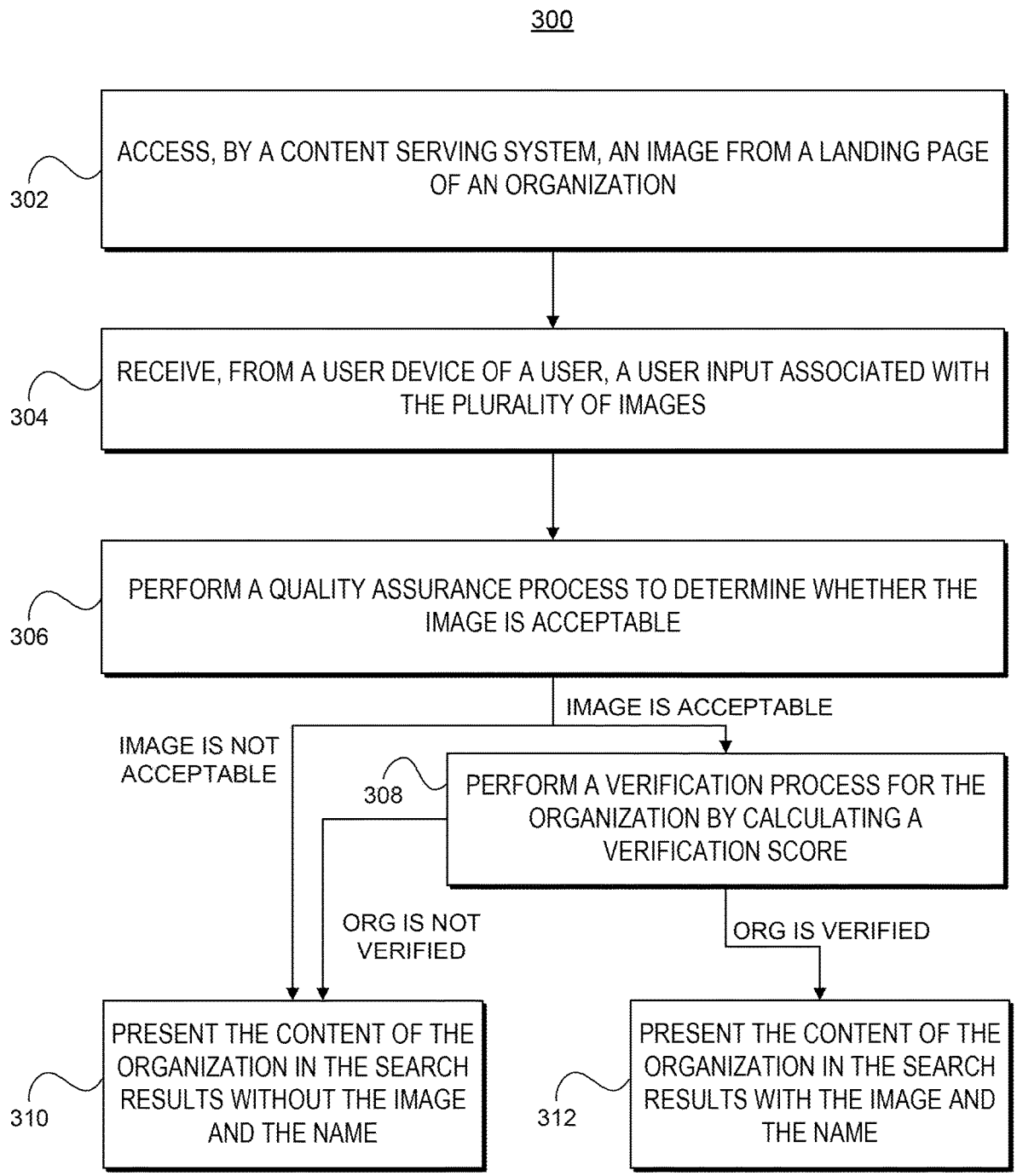
FIG. 3 depicts a flow chart diagram of an example method according to some implementations of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of method 300 can be omitted, rearranged, combined, and/or adapted in various ways without deviating from the scope of the present disclosure.

At operation 302, the content serving system can access (e.g., retrieve, call) a plurality of images from a landing page of an organization. The content serving system can select an image from the plurality of images. The selected image may be used as the image of the organization when content is presented in a search result. The landing page can be a webpage associated with a specific URL. For example, a search result page can include a plurality of URLs associated with the search query. When a user clicks on one of the URLs presented in the search result page, the content serving system can open the landing page of the organization that is associated with the clicked URL.

At operation 304, the content serving system can receive, from a user device of a user, a user input associated with the image. The user input can be in response to the plurality of images being presented. The user device can be of user (e.g., administrator) that is associated with the organization. In some instances, the user device (e.g., that is associated with the organization) can perform an action with the image that is retrieved at 310. For example, the user device can accept the image. Alternatively, the user device can upload, to the content serving system, a new image associated with the organization. In some instances, the content serving system can obtain data (e.g., image, name) from the organization.

At operation 306, the content serving system can perform a quality assurance process to determine whether the image of the organization is acceptable. In some instances, the content serving system can obtain a name of the organization from the landing page at 302 and perform a quality assurance process to determine whether the name of the organization is acceptable at 306. For example, the content serving system can verify whether the name and image are presented prominently on the landing page.

At operation 308, the content serving system performs a verification process for the organization. The verification process can assist in determining whether the organization is allowed to serve (e.g., show) the image. The verification can be performed when the data (e.g., image, name) is provided by the organization, such as in operation 320. Additionally, the determination can be performed at runtime (i.e., in real-time) when the content is presented in a search result. In some instances, the real-time verification process performed at runtime can include verifying the organization by whether the organization is verified and/or trusted by querying a database of the verified organization.

At operation 308, the content serving system can calculate a verification score for the organization as part of the verification process. In example, the organization can be determined to be verified if the verification score exceeds a threshold value (e.g., 100). The verification score can be calculated based on the ranking of the organization in an organic search result. For example, the content serving system can receive a search query having a keyword and calculate a verification score for the organization based on the association of the organization with the keyword. Additionally, the verification score can be derived from a search score that is determined by an organic search module. The search score can be based on a ranking system of the organic search module. The search score can be directly proportioned to the ranking of the organization and/or URL of the organization in a search result.

At operation 310, when the organization is not verified, the content serving system may not include the image and name of the organization in the content (e.g., sponsored content, organic content) presented to a user device. The content serving system may not include the image and name of the organization to reduce the risk of abuse by bad actors.

At operation 312, when the organization is verified, the content serving system can include the image and name of the organization in the content (e.g., sponsored content, organic content) presented to a user device. From a user perspective, the content serving system provides quality controls to signal to the user that the sponsored content is from a verified organization and that there is a high likelihood that the content is credible.

Figure 4:
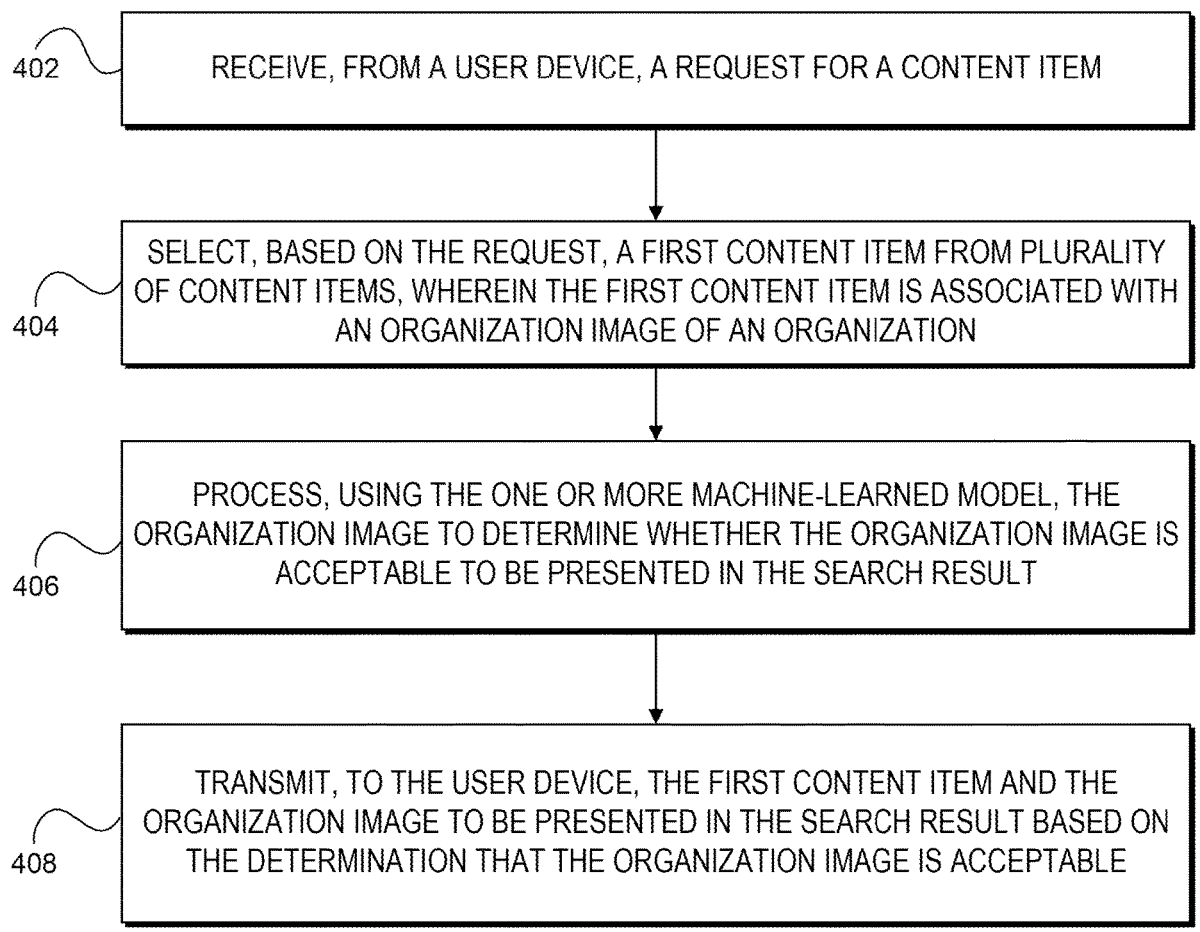
FIG. 4 depicts a flow chart diagram of an example for presenting a search result in response to a search query, according to example embodiments of the present disclosure.

FIG. 4 depicts a flow chart diagram of an example for presenting a search result in response to a search query, according to example embodiments of the present disclosure. Although FIG. 4 depicts steps performed in a particular order for purposes of illustration and discussion, the methods of the present disclosure are not limited to the particularly illustrated order or arrangement. The various steps of method 400 can be omitted, rearranged, combined, and/or adapted in various ways without deviating from the scope of the present disclosure.

In some instances, method 400 can include a computing system having one or more machine-learned models. The one or more machine-learned models can be configured to determine whether an image is acceptable to be presented in the search result.

The computing system can be user computing device 102, server computing system 130, content management system 122, or verification system 140. The computing system can use one or more processors (e.g., processor(s) 112, 132) to perform method 400.

At 402, the computing system (e.g., server computing system 130) can receive, from a user device, a request for a content item.

At 404, the computing system can select, based on the request, a first content item from a plurality of content items. The first content item can be associated with an organization image of an organization.

Figure 6:
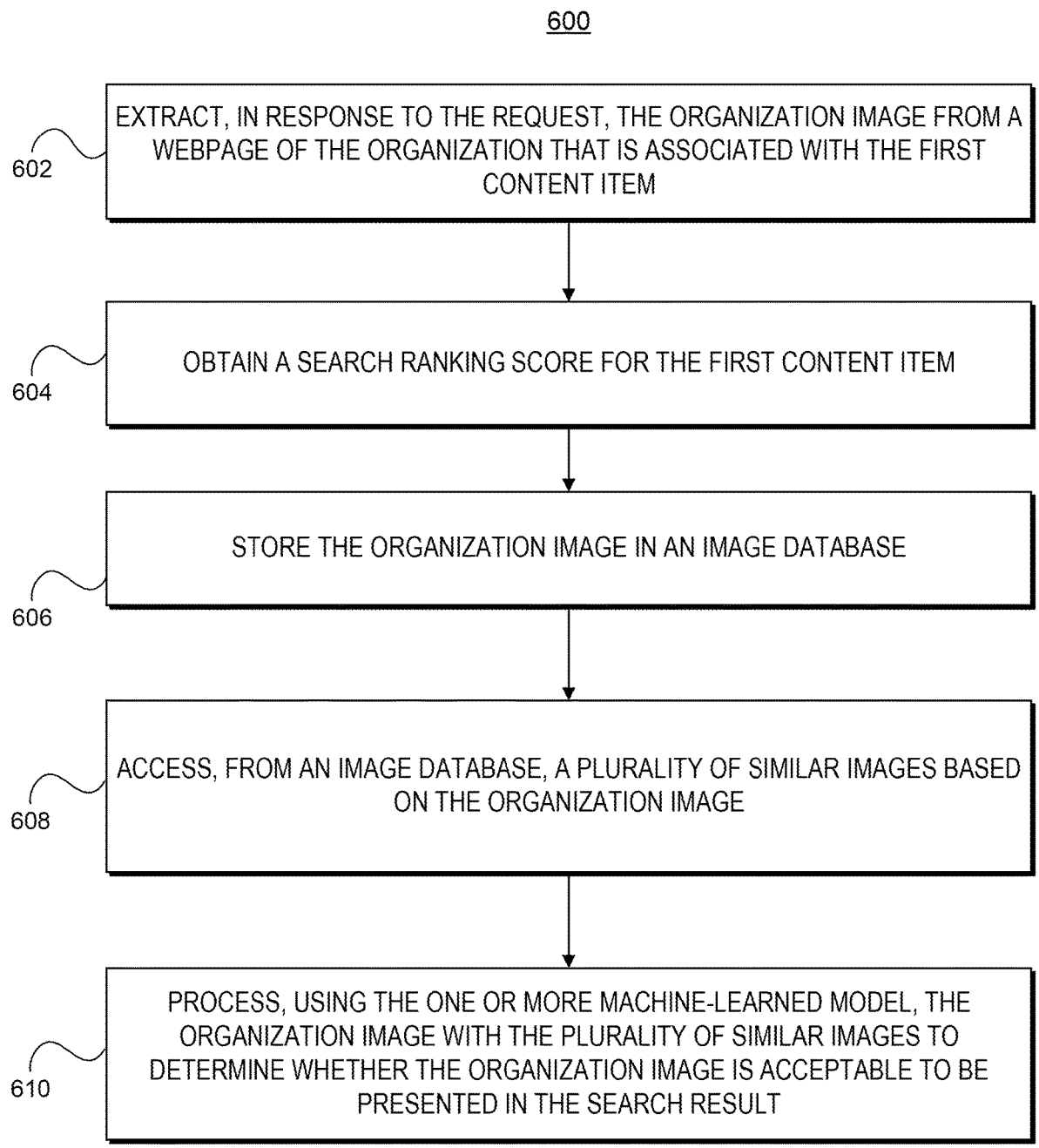
FIG. 6 depicts a flow chart diagram of an example for determining whether an image is acceptable to be presented in a search result, according to example embodiments of the present disclosure.

At 406, the computing system can process, using the one or more machine-learned model (e.g., machine-learned models 115, 142), the organization image to determine whether the organization image is acceptable to be presented in the search result. FIG. 6 and method 600 describe techniques for determining whether the organization image is acceptable to be presented in the search result.

At 408, the computing system can transmit to the user device (e.g., user device 102), the first content item and the organization image to be presented in the search result based on the determination that the organization image is acceptable.

In some instances, the computing system can present, on a display of the user device, the first online content item with the organization image when the image is determined to be acceptable.

Figure 5:
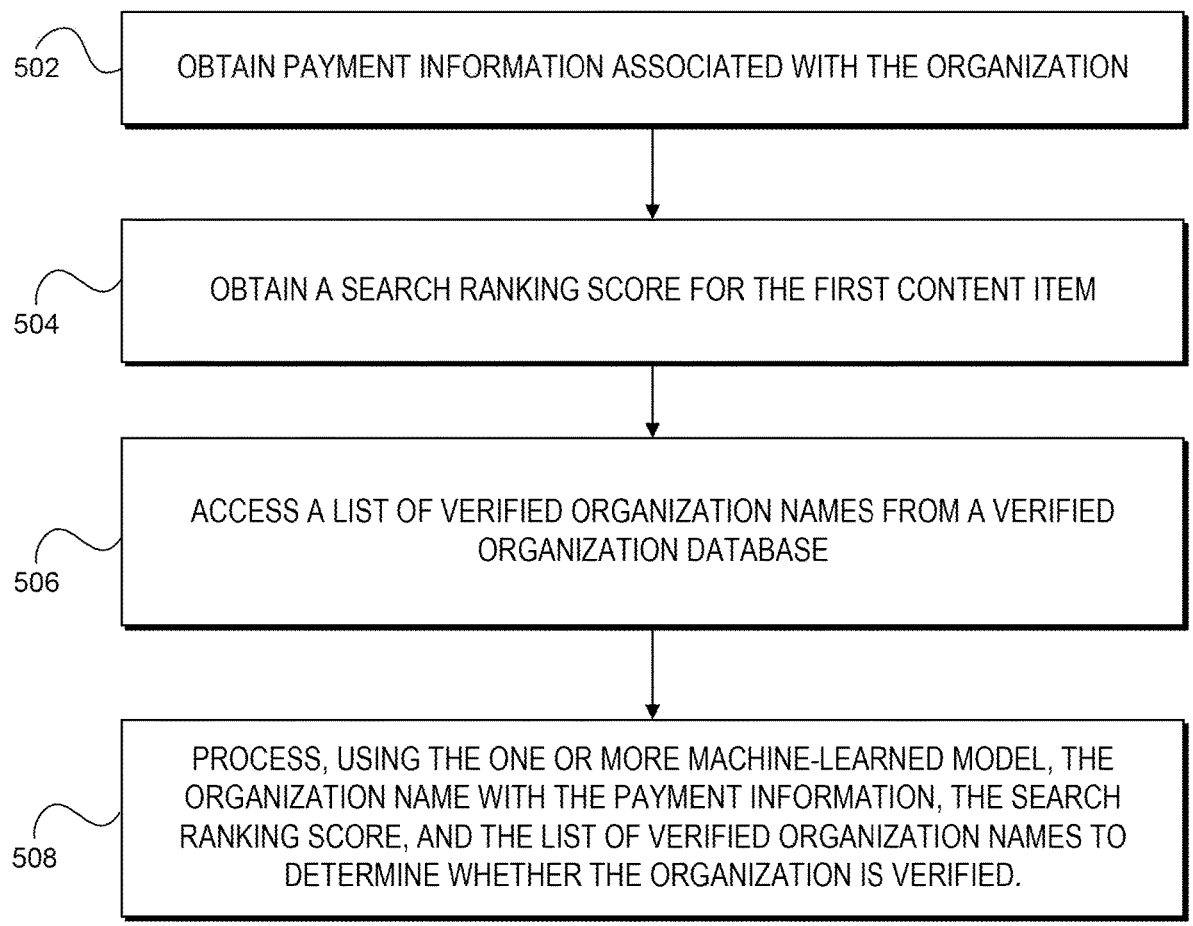
FIG. 5 depicts a flow chart diagram of an example for verifying an organization name, according to example embodiments of the present disclosure.

In some instances, where the first content item is associated with an organization name of the organization, the computing system can process, using the one or more machine-learned model, the organization name to determine whether the organization name is verified. Additionally, the computing system can transmit, to the user device, the organization name to be presented in the search result based on the determination that the organization name is verified. FIG. 5 and method 500 describe techniques for determining whether the organization name is verified so that the organization name can be presented in the search result.

In some instances, the computing system can present, on a display of the user device, the first online content item with the organization image when the organization image is determined to be acceptable, and the first online content item with the organization name when the organization name is determined to be verified. As depicted in FIG. 2, the first content item can include a link, the organization image can be placed on the left side of the link, and the organization name can be placed above the link. The link can be a Uniform Resource Locator (URL) of an address associated with a webpage of the organization.

Alternatively, the computing system can present, on a display of the user device, the first online content item with the organization image when the organization image is determined to be acceptable, but the first content item can be without the organization name when the organization name is not verified.

In some instances, the organization name can be verified in real-time by querying a database of verified organizations using the techniques described herein. For example, as depicted in FIG. 1, the database of verified organizations can be a first-party database that is maintained by the computer system.

In some instances, the computing system can identify a plurality of content items based on the request. Additionally, the computing system can select, based on a search ranking score, the first content item from the plurality of content items.

In some instances, the computing system can present, on a display of the user device, the first online content item without the organization image when the image is determined not acceptable.

In some instances, the computing system can present, on a display of the user device, the first online content item without the organization name when the organization name is not verified.

FIG. 5 depicts a flow chart diagram of an example for verifying an organization name, according to example embodiments of the present disclosure. Although FIG. 5 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

In some instances, method 500 can include a computing system having one or more machine-learned models. The one or more machine-learned models can be configured to determine whether an organization is verified. The computing system can be user computing device 102, server computing system 130, content management system 122, or verification system 140. The computing system can use one or more processors (e.g., processor(s) 112, 132) to perform method 500.

According to some embodiments verifying an organization can also include determining whether the organization is eligible for having sponsored content with an organization image and/or organization name.

At 502, the computing system (e.g., server computing system 130) can obtain payment information associated with the organization. In some instances, the payment information can be obtained from the organization. For example, the first content item can be a sponsored content item, where the organization submits payment information for the sponsored content. The payment information can include credit card information, address (e.g., zip code), and other information to process a payment.

At 504, the computing system can obtain a search ranking score for the first content item. The search ranking score can be calculated by the server computing system. For example, the search ranking score can rank a content item for a specific keyword(s).

At 506, the computing system can access a list of verified organization names from a verified organization database. Additionally, the system can verify the organization name with the verified organization database (e.g. verified organization database 148). In some instances, the server computing system 130 can store the verified organization database 148 locally in order to reduce the query time to obtain this information.

At 508, the computing system can process, using the one or more machine-learned model, the organization name with the payment information, the search ranking score, and the list of verified organization names to determine whether the organization is verified.

In some instances, operations 502, 504, 506, and 508 can be pre-determined prior to the presentation of the sponsored content. A database (e.g., content database 123, memory 134, verified organization database 148) can maintain a list of organizations that are verified. The organizations that are verified, as depicted in FIG. 3, can have sponsored content with an organization image and/or organization name. For example, as described in operation 408, the system can transmit, in real-time, to the user device the first content item, the organization image, and the organization name to be presented in the search result based on an offline (e.g., occurring prior to the system receiving the request for a content item at operation 402) determination that the organization is verified (e.g., eligible).

In some instances, the organization can be verified based on an amount of budget spend on sponsored content by the organization (e.g., spend being greater than zero in order to be verified), the age of the account associated with the organization (e.g., the account should be at least 90 days old), the organization not being in a sensitive industry, or the organization not having prior policy violations (e.g., calculated based on a score).

Additionally, in some instances, the organization can be verified based on the size of the organization, or a search engine result page (SERP) score. For example, larger organizations can have a higher likelihood of being verified. The SERP score can be a measure of how frequently a particular site appeared in search page results.

FIG. 6 depicts a flow chart diagram of an example for determining whether an image is acceptable to be presented in a search result, according to example embodiments of the present disclosure. Although FIG. 6 depicts steps performed in a particular order for purposes of illustration and discussion, the methods of the present disclosure are not limited to the particularly illustrated order or arrangement. The various steps of method 600 can be omitted, rearranged, combined, and/or adapted in various ways without deviating from the scope of the present disclosure.

In some instances, method 600 can include a computing system having one or more machine-learned models. The one or more machine-learned models can be configured to determine whether an organization image is acceptable to be presented in a search result. The computing system can be user computing device 102, server computing system 130, content management system 122, or verification system 140. The computing system can use one or more processors (e.g., processor(s) 112, 132) to perform method 600.

At 602, the computing system (e.g., server computing system 130) can extract (e.g., obtain), in response to the request, the organization image from a webpage of the organization that is associated with the first content item.

At 604, the computing system can receive, from a device (e.g., user device 102) associated with the organization, the organization image. In some instances, the organization image can be uploaded to the system by the device associated with the organization. For example, the organization image can be uploaded concurrently with the payment information for the sponsored content. Alternatively, instead of receiving the organization image, the system receives from the device associated with the organization a confirmation that the organization image obtained at 602 is correct.

At 606, the computing system can store the organization image extracted at 602 and/or received at 604 in an image database. For example, the organization image can be stored in the image database 128 of FIG. 1. In some instances, the computing system can later access this organization image stored in the image database for making a determination at a future time about another image.

At 608, the computing system can access, from the image database (e.g., image database 128), a plurality of similar images based on the organization image. In some instances, the plurality of similar images being accessed from the image database can be selected and/or determined by the one or more machine-learned model. The images that are selected from the image database can be based on a similarity score with the organization image. The machine-learned model can select an image from the image database when the similarity score with the organization image is above a similarity threshold. For example, when the organization image is an image of an aircraft, the plurality of similar images accessed at 608 can also be images of an aircraft. In some instances, the images stored in the image database 128 can be labeled by the machine-learned model. The machine-learned model can process each image stored in the image database to label (e.g., classify) the image. The labels can include a description of the image (e.g., aircraft), a type of image (e.g., portrait), whether the image is a known brand and/or logo, whether the image is deemed to be acceptable or not acceptable, whether the image is deemed to be inappropriate, and so on. Inappropriate images can include information or images that is not appropriate for children, adult material, offensive material, inaccurate information, information related to dangerous behavior, unlawful information, material containing or promoting violence, gruesome material, offensive language, and so on. Inappropriate images can be also labeled as not acceptable images to be presented in a search result.

At 610, the computing system can process, using the one or more machine-learned model, the organization image with the plurality of similar images to determine whether the organization image is acceptable to be presented in the search result. For example, if the organization image is similar to a known image (e.g., known logo and/or brand) associated with a different organization (e.g., airline company), then the system can determine that the organization image is not acceptable to be presented in the search result because it will cause confusion.

In some instances, the machine-learned model can process the organization image with an image from the plurality of similar images to generate a similarity score. The system can determine that the organization image is acceptable when the similarity score is below a predetermined threshold. Alternatively, the system can determine that the organization image is not acceptable when the similarity score is above a predetermined threshold.

For example, the computer system can compare the organization image received at 604 or extracted at 602 with a known image (e.g., image being labeled as a registered brand/logo of a reputable organization) from the image database. The system can determine that the organization image is not acceptable when the similarity score between the organization image and the known image is above the similarity threshold value.

In another example, the computer system can compare the organization image received at 604 or extracted at 602 with an inappropriate image (e.g., image being labeled as inappropriate) from the image database. The system can determine that the organization image is not acceptable when the similarity score between the organization image and the inappropriate image is above the similarity threshold value.

In yet another example, the computer system can select and access a plurality (e.g., 10, 100) of similar images from the image database. The system can compare each image from the plurality of similar images with the organization image to calculate a similarity score. The system can determine that the organization image is appropriate when the similarity score for each of the comparisons is below the similarity threshold value.

In some instances, some or all of the operations in method 600 can be performed offline. For example, the determination that the organization image is acceptable is performed offline by the one or more machine-learned model before receiving the request from the user device. Additionally, the images stored in the image database (e.g., 128) can be pre-labeled as either acceptable or not acceptable.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination. Additionally, features described with respect to particular headings may be utilized with respect to and/or in combination with illustrative implementations described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computing system for presenting a search result, the computing system comprising:
   one or more processors; and
   one or more non-transitory computer-readable media that collectively store instructions that, when executed by the one or more processors, cause the computing system to perform operations, the operations comprising:
   receiving, from a user device, a request for a content item;
   selecting, based on the request, a first content item from a plurality of content items, wherein the first content item is associated with an organization image and organization name of an organization, and wherein the first content is sponsored content;
   obtaining payment information from the organization;
   processing, using one or more machine-learned model, the organization image to determine whether the organization image is acceptable to be presented in the search result;
   processing, using the one or more machine-learned model, the organization name with the payment information to determine whether the organization name is verified;
   transmitting, to the user device, the organization name to be presented in the search result based on the determination that the organization name is verified; and
   transmitting, to the user device, the first content item and the organization image to be presented in the search result based on the determination that the organization image is acceptable.

2. The computing system of claim 1, the operations further comprising:
   presenting, on a display of the user device, the first content item with the organization image when the image is determined to be acceptable.

3. The computing system of claim 1, wherein the first content item is associated with an organization name of the organization, the operations further comprising:
   processing, using the one or more machine-learned model, the organization name to determine whether the organization name is verified; and
   transmitting, to the user device, the organization name to be presented in the search result based on the determination that the organization name is verified.

4. The computing system of claim 3, the operations further comprising:
   presenting, on a display of the user device, the first content item with the organization image when the organization image is determined to be acceptable, and the first content item with the organization name when the organization name is determined to be verified.

5. The computing system of claim 4, wherein the first content item includes a link, wherein the organization image is placed on a left side of the link, and the organization name is placed above the link.

6. The computing system of claim 5, wherein the link is a Uniform Resource Locator of an address associated with a web page of the organization.

7. The system of claim 3, the operations further comprising:
   presenting, on a display of the user device, the first content item with the organization image when the organization image is determined to be acceptable, and the first content item without the organization name when the organization name is not verified.

8. The computing system of claim 3, where the organization name is verified in real-time by querying a database of verified organizations.

9. The computing system of claim 8, wherein the database of verified organization is a first-party database that is maintained by the computer system.

10. The computing system of claim 3, wherein the first content item is a sponsored content item, the operations further comprising:
    obtaining payment information from the organization; and processing, using the one or more machine-learned model, the organization name with the payment information to determine whether the organization is verified.

11. The computing system of claim 3, the operations further comprising:
accessing a list of verified organization names from a verified organization database; and
processing, using the one or more machine-learned model, the organization name with the list of verified organization names to determine whether the organization is verified.

12. The computing system of claim 1, the operations further comprising:
extracting, in response to the request, the organization image from a webpage of the organization that is associated with the first content item;
receiving, from a device associated with the organization, a confirmation of the organization image; and
storing the organization image in an image database.

13. The computing system of claim 1, the operations further comprising:
accessing, from an image database, a plurality of similar images based on the organization image; and
processing, using the one or more machine-learned model, the organization image with the plurality of similar images to determine whether the organization image is acceptable to be presented in the search result.

14. The computing system of claim 13, wherein the determination that the organization image is acceptable is performed offline by the one or more machine-learned model before receiving the request from the user device, and wherein images stored in the image database are labeled as either acceptable or not acceptable.

15. The computing system of claim 13, wherein the plurality of similar images being accessed from the image database are determined by the one or more machine-learned model.

16. The computing system of claim 1, the operations further comprising:
presenting, on a display of the user device, the first content item without the organization image when the organization image is determined not acceptable.

17. A computer-implemented method to present a search result, the method comprising:
receiving, from a user device, a request for a content item;
selecting, based on the request, a first content item from a plurality of content items, wherein the first content item is associated with an organization image and organization name of an organization, and wherein the first content is sponsored content;
obtaining payment information from the organization;
processing, using one or more machine-learned model, the organization image to determine whether the organization image is acceptable to be presented in the search result;
processing, using the one or more machine-learned model, the organization name with the payment information to determine whether the organization name is verified;
transmitting, to the user device, the organization name to be presented in the search result based on the determination that the organization name is verified; and
transmitting, to the user device, the first content item and the organization image to be presented in the search result based on the determination that the organization image is acceptable.

18. One or more non-transitory computer-readable media that store instructions that, when executed by one or more processors, cause the one or more processors to perform operations, the operations comprising:
receiving, from a user device, a request for a content item;
selecting, based on the request, a first content item from a plurality of content items, wherein the first content item is associated with an organization image and organization name of an organization, and wherein the first content is sponsored content;
obtaining payment information from the organization;
processing, using one or more machine-learned model, the organization image to determine whether the organization image is acceptable to be presented in the search result;
processing, using the one or more machine-learned model, the organization name with the payment information to determine whether the organization name is verified;
transmitting, to the user device, the organization name to be presented in the search result based on the determination that the organization name is verified; and
transmitting, to the user device, the first content item and the organization image to be presented in the search result based on the determination that the organization image is acceptable.

* * * * *